May 12, 1936.  J. W. ANDERSON  2,040,195
INDICATOR
Filed Oct. 23, 1931

INVENTOR.
John W. Anderson.
BY
Slough and Canfield
ATTORNEYS.

Patented May 12, 1936

2,040,195

UNITED STATES PATENT OFFICE 2,040,195

INDICATOR

John W. Anderson, Gary, Ind.

Application October 23, 1931, Serial No. 570,555

11 Claims. (Cl. 177—351)

This invention relates to indicating systems, and relates more particularly to systems for indicating certain variable conditions prevailing in connection with the water cooling system of an automobile.

It is of considerable importance to the operator of an automobile or like vehicle propelled by an internal combustion engine of the water cooled type to be informed at all times relative to the amount of water contained in the water cooling system associated with the engine, and it is also important to him to be informed whenever the water, during the operation of the engine, reaches the boiling temperature.

The prevailing practice in connection with automobiles has been to tightly close by a radiator cap the filling opening of the water cooling radiator of the vehicle and to provide, either mounted upon such cap or upon the instrument board of the vehicle, an indicating instrument to indicate, during the operation of the vehicle, the temperature of the water in the radiator or other part of the cooling system.

It is a fact, however, that indicators of the nature ordinarily heretofore employed do not reliably, or with definiteness, indicate the approach of the liquid temperature from a non-boiling to a boiling temperature, and that therefore, before the change to actual boiling is indicated, a quantity of the hot expanded water or part water and part steam, may escape from the radiator by way of the overflow pipe thereof, without notice to the operator of the automobile, and thus a serious loss of cooling liquid from the cooling system may occur.

Liquid level indicators employing floats or the like as the motivating element have been proposed for automobile radiators to indicate the level of liquid in such radiators and to thus inform the operator of any loss of liquid, but the complexity and unsuitability of such devices and the limitations imposed upon them by radiator constructions have prevented their going into use, at least to any substantial extent.

Such liquid level indicators moreover fail to provide the operator of the vehicle with any information as to whether the water in the system is at or near boiling point, and thus are totally ineffective as an aid to the operator in preventing loss of liquid when boiling occurs.

An object of my invention therefore is to provide for the water cooling system of an internal combustion engine, an improved indicating system adapted to keep the operator informed at all times as to the amount of liquid in the water cooling system.

Another object of my invention is to provide improved means for remotely indicating the amount of liquid in the water cooling system of an internal combustion engine.

Another object of my invention is to provide an improved means for indicating in a marked manner, or signaling, the transition of the radiator cooling water temperature to or above the boiling point.

Another object of my invention is to provide an improved means for indicating, remotely from the water cooling system, as for example on the dash of the vehicle, and in a marked manner, or by signaling, the transition of the radiator cooling water temperature to or above the boiling point.

Another object of my invention is to provide a single means for indicating both the liquid level for all temperatures of the water and to indicate in a marked manner or by signaling, when the water reaches the boiling temperature.

Another object of my invention is to provide a single means for indicating, remotely from the liquid cooling system as, for example upon the dash of the vehicle, both the liquid level for all temperatures of the water and to indicate in a marked manner or by signaling, when the water reaches the boiling temperature.

Other objects will be apparent to those skilled in the art to which my invention appertains.

My invention is fully disclosed in the following description taken in connection with the accompanying drawing, in which.

Figure 1:
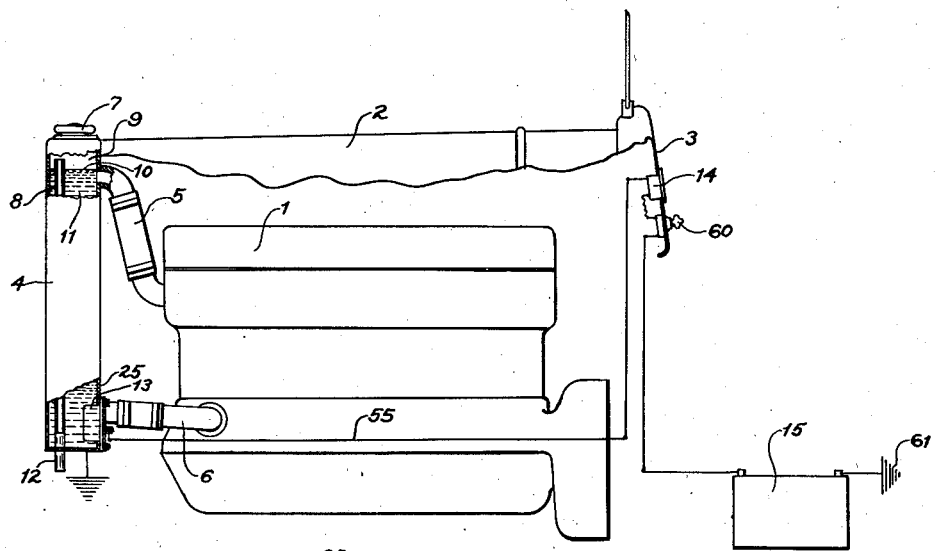
Fig. 1 is a side elevational view of an automobile engine illustrating an embodiment of my invention applied thereto, the parts being illustrated in simplified and semi-diagrammatic form.

Referring to the drawing, I have shown generally at 1 an internal combustion engine under the fragmentarily illustrated hood 2 of an automobile, and at 3 a dash-board or instrument board of the vehicle. Forwardly of the engine 1 is the usual or any suitable radiator 4 having circulating water conduits 5 and 6 for respectively conducting hot water from the engine jacket to the radiator in the upper portion thereof and for conducting the cooled water from the lower part of the radiator to a lower portion of the engine jacket.

The radiator has a filling cap 7 sealingly closing a filling aperture in the upper portion of the radiator, and the radiator internally is provided with an overflow pipe 8 opening upwardly into a space 9 above the surface 10 of the water 11 in the radiator and extending downwardly through the radiator and discharging as at 12 into the atmosphere.

When filling the radiator through the cap, the surplus water may flow out of the pipe 8. Preferably also, the pipe 8 is of relatively constricted bore area, whereby, if for any reason the water 11 becomes so hot as to expand or to boil or generate steam in the space 9, the steam or the air under pressure above the liquid level may escape through the pipe 8 but not as rapidly as the pressure is created, whereby a pressure above atmospheric pressure will be created in the space or chamber 9 above the water for a purpose to be described.

In the radiator is an electric controller device 13 responsive to external pressure exerted thereupon. By disposing the device 13 at a relatively low point on the radiator, as illustrated for example, it will respond to the pressure of the fluid or hydraulic head of the liquid 11, and also to an increase of the pressure occasioned by fluid pressure in the chamber 9 greater than atmospheric pressure, if and when the liquid rapidly expands, or rises to or above the steam generating temperature.

At 14, on the instrument board 3 is illustrated an indicating instrument, and at 15 a storage battery which may be the usual battery of the vehicle. The controller 13 and instrument 14 are shown separately, in Figs. 2 and 3, respectively, and in a manner to be described are connected in an electric circuit with the battery 15; and by changes of current in the circuit effected by the response of the device 13 to changes of pressure, the instrument 14 indicates on a scale 16 thereof the changes of pressure.

The controller 13 comprises an outer casing 20, preferably of metal, in the form of a cup, the bottom of which is provided with a large perforation 21 sealed by a resilient diaphragm 22 secured in any preferred manner such, for example, as by soldering, to the inner wall of the housing 20. The open end of the cup terminates in an outwardly directed annular flange 23 whereby, by means of suitable bolts 24, the housing 20 may be sealedly connected to the wall 25 of the radiator, the housing being projected through a large perforation 26 in the wall 25 and sealing packing material 27 being interposed between the flange 23 and the wall 25, and the bolts 24 being projected through suitable aligned perforations in the wall 25 and flange 23. The bolts 24 may also be employed to secure to the outer open end of the housing 20 a base 28 entirely covering the open end of the cup-like housing 20. Thus an entirely closed chamber 29 is provided and, assuming that the radiator water 11 has been put in the radiator, the chamber is immersed in the water and the diaphragm 22 is exposed to the pressure head thereof. Preferably the base 28 does not seal the chamber 29, thus allowing the pressure in the chamber at all times to be equalized to atmospheric pressure.

Secured to the inner wall of the housing 20, is a U-shaped thermostatic element 30, formed preferably from bimetal and comprising a closed end 31 supported upon the housing wall by a clamping plate 32 and comprising substantially parallel legs 33 and 34 extending inwardly approximately to the center of the housing. The bimetal leg 34 has wound thereon a heating winding 35, the electric circuit for which will be described. The outer free ends of the legs 33 and 34 have interposed therebetween a bridging thrust element 36 in the form of a post having a reduced neck 37 projected through a perforation in the end of the leg 34 and having on its opposite end a reduced neck of greater longitudinal dimension 38, projected through a suitable perforation in the leg 33, and the parts thus far described are arranged so that the end of the neck 38 may engage the inner surface of the diaphragm 22.

Upon a change of temperature in the chamber 29, the two legs 33 and 34 tend to move oppositely thermostatically, thus compensating each other for changes of ambient temperature and effecting no resultant thrust on the element 36, but an increase of temperature of the leg 34 by electric current in the heating winding 35 tends to bend this leg toward the diaphragm 22 producing a resultant thrust on the element 36 and neck 38, and bending outwardly the resilient diaphragm 22.

An electric contact 40 is secured to the inner side of the diaphragm 22 and a mating contact 41 adapted to engage the same is secured on the free end of a flat resilient sheet metal spring 42, supported at its opposite end upon a riser 43 which, at its lower end, has a flange 45 by which, in connection with a bolt 46 and insulating material 47, may be rigidly secured to but electrically insulated from the base 28.

Outward movement of the diaphragm 22 as just described may break the engagement of the contact 40—41. The position of the contact 41 may be adjusted by means of a screw 50 longitudinally adjustably threaded as at 51 through the base 28 and locked in any adjusted position by a lock nut 52. The screw 50 is insulated from the base 28 by an insulating bushing 53 in which the screw-threads are formed.

The electric circuit for energizing the heating winding 35 is by way of an incoming wire 55 connected to a binding post 56 insulatedly mounted on the base 28, by a wire 57 connecting the post, inwardly of the chamber 29 with the winding 35, through the winding and by a wire 58 to a connection point 59 on the riser 43, through the riser, through the resilient arm 42, contacts 41—40, diaphragm 22, through a ground on the housing 20, bolt 24 and radiator wall 25.

Figure 2:
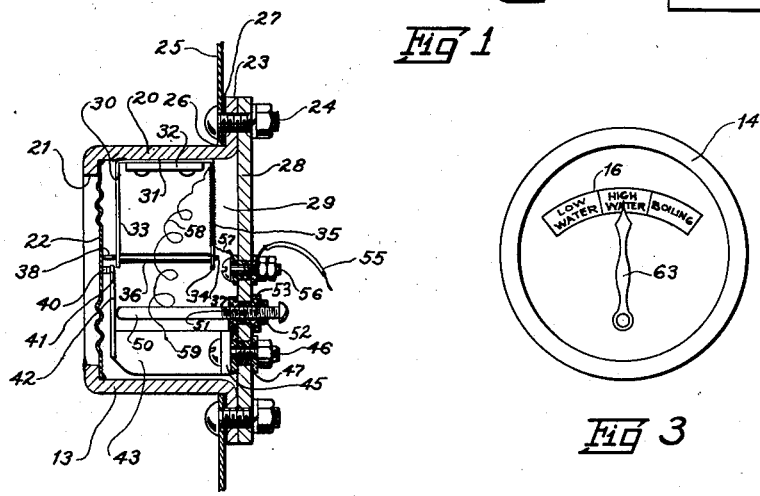
Fig. 2 is a cross-sectional view, approximately full size, of a part of an apparatus which I may employ and illustrated in Fig. 1.
Figure 3:
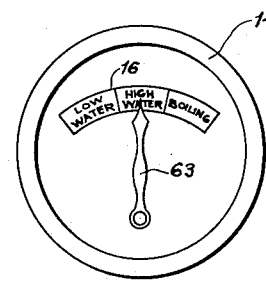
Fig. 3 is a front elevational view of an indicating instrument which I may employ and forming part of the embodiment of my invention.

When current flows through this circuit in a manner to be more fully described, from the battery 15, the winding 35 is thereby heated, moving the leg 34 to the left as viewed in Fig. 2, displacing the diaphragm 22 outwardly, and breaking the circuit on the contacts 40—41. The winding 35 then cools off and permits the diaphragm 22 to retract ultimately again closing the contact 40—41 and repeating the operation.

Thus a succession of electric impulses flows through the circuit described. And as will now be apparent, if the pressure externally applied on the diaphragm 22 be relatively great, the heating winding 35 will have to heat the thermostatic leg 34 to a higher temperature before it will exert enough force to move the diaphragm 22 sufficiently to break the contact 40—41, and vice versa for a lesser diaphragm pressure. Thus the duration of the impulses will be greater for a greater pressure on the diaphragm, and vice versa.

The duration of the impulses at any selected pressure may be adjustably varied by means of the adjusting screw 50, thus the impulses may be made of greater duration by adjustably moving the contact 40 toward the diaphragm 22.

The above described electric circuit including the wire 55, see Fig. 1, is through the instrument 14 and through a key-operated switch 60 and battery 15 to ground at 61. Thus the instrument 14 is energized by a succession of impulses of duration varying according to the pressure on the diaphragm 22.

The particular construction of the instrument 14 is not an essential part of my invention, it being only necessary that the instrument have a movable indicating finger or vane 63 movable over a dial or scale 16 and that the scale 16 be adapted by suitable insignia and by suitable calibration to indicate, as desired, the variations of pressure on the diaphragm 22 in the radiator; and that the instrument be responsive to a succession of current impulses and to cause the vane or needle 63 to take up a position corresponding to the duration of the impulses.

In the copending application of Theodore J. Smulski, Serial No. 538,152, filed May 18, 1931, an indicating instrument responsive to current impulses of varying duration is shown and described, and such an instrument may be employed for the instrument 14.

The scale 16 is preferably divided into three divisions indicating, respectively, "low water", "high water", "boiling", but other suitable indicia may be put on the scale 16 as will be understood from the following description of the mode of operation.

When the radiator 4 is full of liquid 11 and the chamber 9 above the liquid is at atmospheric pressure, the corresponding pressure on the diaphragm 22 will, in the manner described hereinbefore, cause a series of current impulses of suitable duration to flow to energize the instrument 14 to move the vane 63 across its range of movement until it registers "high water". This will be the maximum registration so long as the water is below the boiling point. Any further addition of water to the radiator 4 will overflow out of the overflow pipe 12.

When the engine is in use and the water 11 becomes warm, it may evaporate and the level thereof will be lowered and the pressure on the diaphragm 22 will be correspondingly decreased and shorten the duration of the current impulses, and this will cause the finger 63 to move toward or to the "low water" division, of the scale 16. The scale 16 will thus indicate to the operator of the vehicle at all times the amount of water in the cooling system by indicating the water level in the radiator.

Now, I have found by experiment that so long as the temperature of the water is kept below the boiling point, the indication on the instrument will be clearly an indication of water level. I have also found, however, that if the engine is being driven hard enough or the outside temperature is high, so that the water continues to increase in temperature, it will reach a critical temperature at which the actual volume of the water suddenly increases, and that if the temperature continues to rise, this is followed by the generation of steam. This sudden increase in volume of water may be accounted for by the formation therein of small bubbles of vapor or steam probably in those portions of the circulating system which are at the highest temperature, such for example, as portions of the water jacket of the engine surrounding the cylinder. The exact cause of the expansion, however, is not of particular importance here. Suffice it to say that I have discovered that an expansion of the water does occur and that it is sufficient to increase the fluid pressure, communicated to the device 13 through the water in the radiator and cause the vane 63 to move over abruptly into the zone, designated by the word "boiling".

If the rate of power development of the engine remains unchanged, the temperature of the water will increase still further and the water will reach the boiling point and generate steam, and, the latter accumulating in the space 9 more rapidly than it can exhaust through the pipe 8, will produce sufficient pressure in the compartment 9 to hold the vane 63 in the boiling zone or move it further thereover.

The "boiling" zone of the instrument thus becomes a danger zone, and the operator is notified thereby, as by a signal, that the operating temperature of the engine is too high and that a loss of cooling fluid is occurring in the steam continually exhausting through the pipe 8.

If now the operator reduces the rate of power development of the engine, it will cool down, and the vane 63 will move back into the water level indicating positions when boiling, and consequent loss of liquid, ceases.

I have found, furthermore, that it is entirely practical to avoid any substantial loss of cooling liquid, even when driving the motor-driven vehicle at relatively high temperatures by utilizing the indications of the instrument above described to determine the maximum possible speed of the engine without boiling the cooling fluid. In this connection, the above described sudden expansion of the liquid, if prior to the true boiling temperature, may be effectively utilized. That is to say, if the car is being driven at forty-five miles an hour over a period of time, the engine gradually becoming hotter and hotter as the cooling liquid increases in temperature, the liquid will suddenly reach its expansion temperature and move the vane 63 over into the boiling zone.

Upon observing this movement, the operator can reduce the speed of the car, say to forty miles an hour, whereupon the liquid will cool down below the expansion point and the vane 63 move back into the liquid level indicating zone, and these changes of temperature may occur with very little or no actual generation of steam and consequent loss of fluid. Thus forty miles an hour may be determined as the maximum speed at which the car can be driven under the attending circumstances obtaining at the time without loss of water by the generation and escape of steam.

It will thus be apparent that by means of my invention, not only can the level of the liquid in the system be indicated to the operator at all times, but, by the same means, he is signaled if the temperature of the liquid reaches the boiling point; and guided by the indications of the instrument, he may control the operation of the invention to maintain the temperature of the liquid always just under or below the boiling temperature. Thus the operator is not only informed of the level of liquid in his cooling system, but is able to maintain it without substantial loss by boiling even over long periods of hard driving.

As hereinbefore mentioned, the system may be adjusted to cause the instrument 14 to indicate properly at any given condition, such as the high water condition, by adjusting the screw 50 of the controller device 13. Other adjusting devices may be employed if desired such as those described in the above-mentioned pending application.

My invention is not limited to the exact details of construction and of circuit connections above shown and described. Many changes and modifications may be made therein within the scope and spirit of my invention without sacrificing its advantages.

I claim:

1. In combination with the cooling liquid system of an internal combustion engine, an electric circuit and current source therefor, a controller in the ciruit constructed to transmit current impulses over the circuit, and subjected to the pressure head of liquid in the cooling system and responsive to variations of the pressure head caused by variations of liquid level and/or by vapor pressure to vary the duration of the impulses, and an indicator in the circuit responsive to the current impulses and constructed to variably indicate liquid level in accordance with the changes of impulse duration.

2. In combination with the cooling liquid system of an internal combustion engine, an electric circuit and current source therefor, a controller in the circuit constructed to transmit electrical energy over the circuit, and subjected to the pressure head of liquid in the cooling system and responsive to variations of the pressure head caused by variations of liquid level and/or by vapor pressure, to vary the rate of energy transmission, and an indicator in the circuit responsive to the current in the circuit and constructed to variably indicate liquid level in accordance with the changes of energy transmission.

3. In combination with the cooling liquid system of an internal combustion engine, an electric circuit and current source therefor, a controller in the circuit constructed to transmit current impulses over the circuit and subjected to the pressure of liquid head in the cooling system and to the pressure of vapor generated from the liquid when heated to or above its vaporizing temperature, and the controller being responsive to variations of the pressure of liquid head caused by variations of liquid level and responsive to the change of pressure occurring upon the generation of vapor pressure, to vary the duration of the impulses, and an indicator in the circuit responsive to the current impulses and constructed to variably indicate liquid level in accordance with changes of impulse duration, and responsive to the current impulses to effect an indication upon the occurence of vapor pressure.

4. In combination with the cooling liquid system of an internal combustion engine, an electric circuit and current source therefor, a controller in the circuit constructed to transmit electrical energy over the circuit and subjected to the pressure of liquid head in the cooling system and also subjected to the pressure of vapor generated from the liquid when heated to or above its vaporizing temperature, and responsive to variations of the pressure head caused by variations of liquid level and responsive upon the occurrence of vapor pressure to vary the rate of energy transmission, and an indicator in the circuit responsive to current in the circuit, and constructed to variably indicate liquid level in accordance with the changes of the energy transmission and to effect an indication upon the occurrence of vapor pressure.

5. In combination with the cooling liquid system of an internal combustion engine, a pressure-responsive device subjected to pressure of the liquid head and to pressure of vapor generated from the liquid by engine heat, an indicator comprising a relatively movable indicating element and a scale for indicating liquid level and for indicating generated vapor pressure, electric means including a source of current, an electric circuit connecting the device and indicator, electro-responsive means in the indicator and pressure-responsive electric energy transmitting means in the device for causing the movable element to effect indications on the scale in correspondence with variations of pressure on the device occasioned by variations of liquid level or in correspondence with variations of pressure occasioned by variations of vapor pressure of the liquid.

6. In combination with the cooling liquid system of an internal combustion engine, a pressure-responsive device subjected to pressure of the liquid head and to pressure of vapor generated from the liquid by engine heat, an indicator comprising a relatively movable indicating element and a scale for indicating liquid level and for indicating generated vapor pressure, electric means including a source of current, an electric circuit connecting the device and indicator, electro-responsive means in the indicator and pressure-responsive electric energy transmitting means in the device for causing the movable element to effect indications on the scale in correspondence with variations of pressure on the device occasioned by variations of liquid level or in correspondence with variations of pressure occasioned by variations of vapor pressure in the liquid system and above the level of the liquid.

7. In combination with a water cooled internal combustion engine, water circulating conduit means therefor, and indicating means having an element disposed in the conduit means responsive both to liquid level variations and/or vapor pressure of the fluid in the conduit.

8. In combination with a water cooled internal combustion engine, water circulating conduit means therefor, and indicating means having an element disposed in the conduit means responsive to both the thermal and pressure effects of the fluid in the conduit, said indicating means comprising an indicator element disposed remotely to the said first named element and means to communicate operative effects to the remotely disposed element to operate it according to the summated effects of liquid level changes and/or vapor pressure changes to which the said first element is exposed.

9. In combination with the cooling system of an internal combustion engine, a pressure responsive device subjected to the pressure of liquid head in the system and subjected to the pressure of vapor generated from the liquid by engine heat, an indicator comprising a relatively movable indicating element and scale element, for indicating levels of liquid and for indicating generated vapor pressure in the system, and transmission means for effecting relative movement of the indicating and scale elements in correspondence with changes of pressure on the pressure responsive device.

10. In combination with the cooling system of an internal combustion engine, a pressure responsive device subjected to the pressure of liquid head in the system, an indicator comprising a relatively movable indicating element and scale element, for indicating levels of liquid and transmission means for effecting relative movement of the indicating and scale elements in correspondence with changes of pressure on the pressure responsive device to cause them to indicate changes of pressure effected by generation of vapor in the liquid substantially at the boiling point of the liquid.

11. In combination with the cooling system of an internal combustion engine, a pressure responsive device subjected to the pressure of liquid head in the system and subjected to the pressure of vapor generated from liquid by engine heat, an indicator comprising a relatively movable indicating element and scale element, for indicating levels of liquid and for indicating generated vapor pressure in the system, and transmission means for effecting relative movement of the indicating and scale elements in correspondence with changes of pressure on the pressure responsive device to cause it to indicate changes of liquid level effected by changes of quantity of liquid in the system, and to cause it to indicate changes of vapor pressure effected by attainment of boiling temperatures.

JOHN W. ANDERSON.